United States Patent [19]

Turley et al.

[11] 4,215,913
[45] Aug. 5, 1980

[54] OPTICAL FIBRE CONNECTORS

[75] Inventors: Wilfred H. Turley; John A. Robinson, both of Kingsthorpe, England

[73] Assignee: Plessey Handel und Investments AG, Zug, Switzerland

[21] Appl. No.: 901,802

[22] Filed: May 1, 1978

[30] Foreign Application Priority Data

May 2, 1977 [GB] United Kingdom ............... 18241/77

[51] Int. Cl.$^2$ ............................................... G02B 5/14
[52] U.S. Cl. .................................................. 350/96.21
[58] Field of Search ................ 350/96.20, 96.21, 96.22

[56] References Cited

U.S. PATENT DOCUMENTS

| 4,047,796 | 9/1977 | Kao et al. | 350/96.21 |
| 4,050,783 | 9/1977 | Tardy | 350/96.21 |
| 4,094,580 | 6/1978 | Cook et al. | 350/96.21 |

Primary Examiner—Rolf G. Hille
Attorney, Agent, or Firm—Fleit & Jacobson

[57] ABSTRACT

An optical fibre connector in which cylindrical probes fitted to optical fibres are insertable into the opposite ends of the resiliently self-centering guide means which retains the two probes in co-axial end-to-end contact, the self-centering guide means comprise cylindrical precision rollers held in angularly-spaced relationship about a common axis by means of a cage structure which is itself surrounded by annular spring means of the guide means.

8 Claims, 4 Drawing Figures

OPTICAL FIBRE CONNECTORS

This invention relates to optical fibre connectors of the general construction forming the subject of our co-pending U.S.A. Patent Application No. 837,286, now abandoned.

Our co-pending patent application referred to relates to an optical fibre connector for effecting end-to-end coupling between optical fibres in which the ends of the fibres to be coupled together are fitted co-axially within cylindrical ferrules or probes and in which these probes are insertable into the opposite ends of resiliently self-centering guide means which retains the two probes in co-axial end-to-end contact.

The guide means may comprise a set of cylindrical rollers of equal diameter each tapered at both ends and annular spring means arranged to hold, in the absence of a probe in the connector, the cylindrical rollers in an annular array around a common axis with their axes parallel to each other and to said common axis and with the surface of each roller projecting radially towards this axis sufficiently to penetrate a cylinder about this axis whose diameter is smaller than the diameter of the thinnest probe for which the connector is intended.

While a connector of the kind described in the last preceding paragraph has been found to ensure good accuracy of alignment provided that a connector is used which is accurately matched, more particularly as regards the diameter of the rollers, to the diameter of the ferrules of the fibres to be coupled, the present invention has for an object to provide an improved construction of optical-fibre connector of that kind which is suitable for establishing accurately aligned end-to-end connection of fibre ends fitted with ferrules which, though equal in diameter for the two fibre ends to be coupled, may have any diameter within a relatively wide range, so that one and the same connector may be used for fibres of various diameters although these are fitted with ferrules of a similar variety of diameters.

According to the present invention there is provided an optical fibre connector of the form just above described in which the cylindrical rollers of the guide means are held in angularly spaced relationship about said common axis by means of a cage structure which is itself surrounded by the annular spring means of the guide means.

In carrying out the present invention the guide means may comprise three identical rollers located in the respective openings of a three-limbed cage structure which may be surrounded by a resilient sleeve co-axial with and embracing the rollers. This sleeve which may be of rubber-type resilient material conveniently extends over the greater length of the rollers and may be bonded to the latter or placed around the rollers with an interference fit.

By way of example the present invention will now be described with reference to the accompanying drawings in which.

Figure 1:
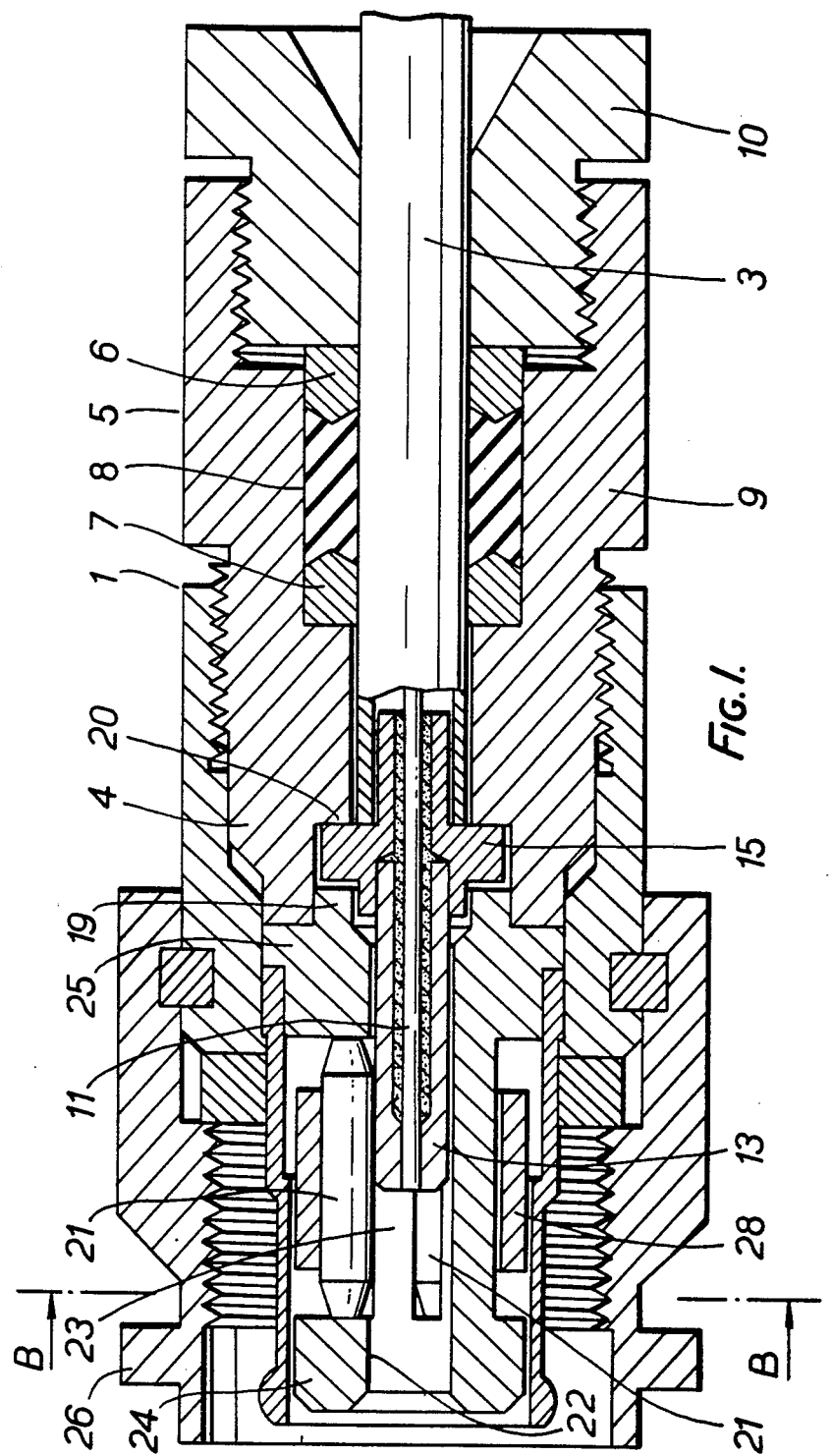
FIG. 1 is a longitudinal cross-sectional view of one part of a single optical fibre connector.
Figure 2:
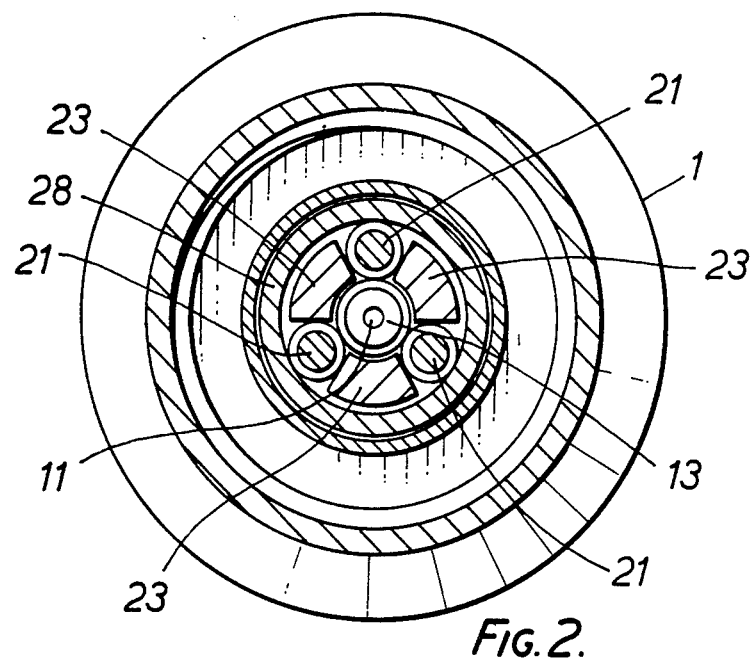
FIG. 2 is a sectional view of the connector part of FIG. 1 taken along the line B—B of FIG. 1.
Figure 4:
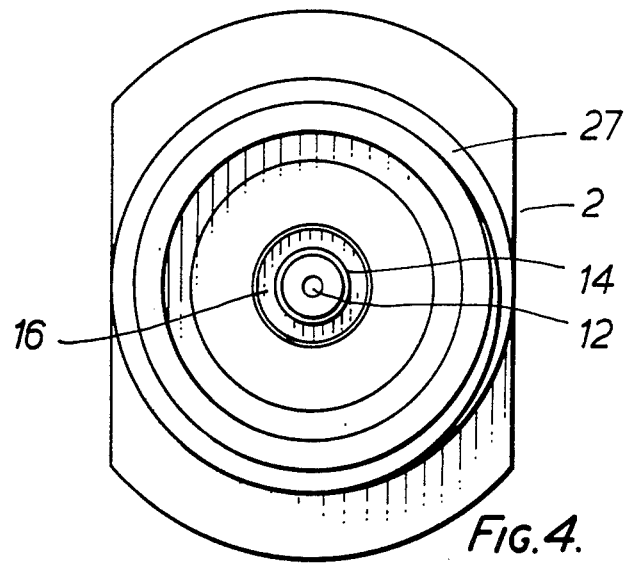
Figure 3:
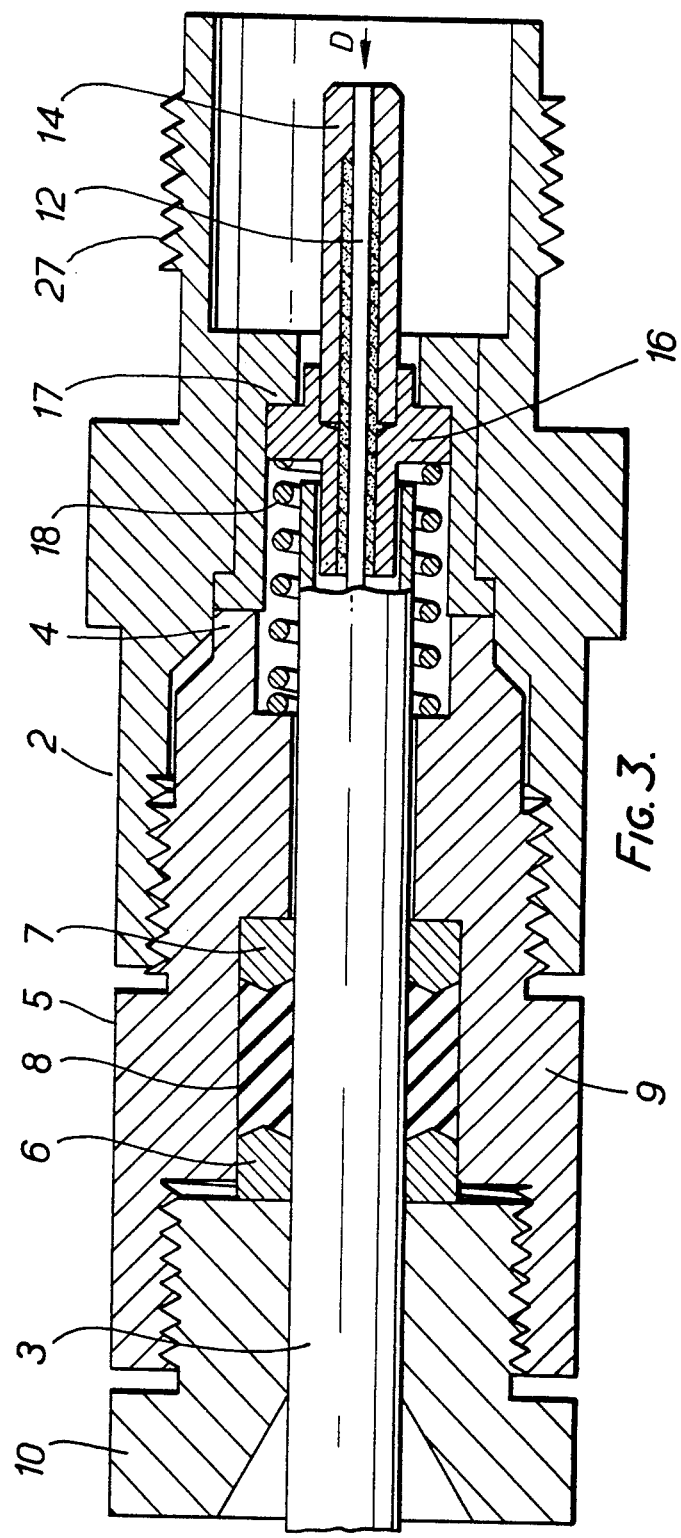
FIG. 3 is a longitudinal cross-sectional view of another part of the connector co-operable with the part depicted in FIGS. 1 and 2; and, FIG. 4 is an end view of the connector of FIG. 3 taken in the direction D.

Referring now to the drawings, FIGS. 1 and 2 show one part 1 of an optical fibre connector, and FIGS. 3 and 4 show the other co-operating part 2 of the same connector. As will be seen, each of the connector parts has an optical fibre cable 3 extending into the connector part body or housing 4 through a cable restraining and sealing arrangement 5 forming the subject of our co-pending Patent Application Ser. No. 901,804, filed May 1, 1978. Briefly, the arrangement comprises a pair of metal thrust rings 6 and 7 surrounding the optical fibre cable 3 and having a deformable sealing ring 8, of Neoprene say, located between them. The rings 6, 7 and 8 are accommodated within internally threaded collar part 9 of the connector part body or housing so that when a clamping nut 10 is screwed into the collar part 9, the thrust rings 6 and 7 are urged towards one another thereby deforming the sealing ring 8 which accordingly clamps the cable 3 to restrain the cable against longitudinal movement and effects sealing between the cable 3 and collar part 9 of the connector to prevent the ingress of dirt and moisture into the connector.

The ends of two optical fibres 11 and 12 which are associated with the respective connector parts 1 and 2 and which are arranged to be coupled together in butted end-to-end alignment when the two connector parts are fitted together, have probes or ferrules 13 and 14 attached to them. These probes or ferrules 13 and 14 have precision cylindrical surfaces and the optical fibre ends are held in accurate co-axial alignment with the cylindrical surfaces, for example in a manner described in our co-pending U.S.A. Patent Application No. 835,918. The probes or ferrules 13 and 14 are also fitted with flanged members 15 and 16 which by co-operation with abutments of the connector part bodies serve to locate or restrict longitudinal movement of the probes or ferrules 13 and 14. In the case of the flange member 16 attached to fibre-carrying ferrule 14, this is urged towards abutment 17 by means of a compression spring 18 so that the ferrule is resiliently mounted along the longitudinal axis of the ferrule. The flange member 15 on the other hand is trapped between abutments 19 and 20 of the connector body so that very little longitudinal movement of the ferrule 13 is permitted when assembled.

Referring now more predominantly to FIGS. 1 and 2, it will be seen that the front end of probe or ferrule 13 is received by a self-centering guide assembly which comprises three precision rollers 21 (e.g. needle bearings) of exactly the same diameter which are angularly spaced from one another around the axis of the ferrule by means of a roller cage structure 22 having three spacer limbs 23 extending between two annular end parts 24 and 25 of greater external diameter. Between these end parts, the roller cage structure 22 and the rollers 21 are contained within a resilient sleeve 28 which may be of Neoprene or other resilient rubber-like material, the sleeve being an interference fit over the rollers 21. When the front end of the ferrule 13 is urged into the self-centering guide roller/cage assembly which action is facilitated by the chamfering of the front end of the ferrule 13 and the tapering of the rollers 21 at the ends thereof, the three rollers make line pressure contact with the precision cylindrical surface of the ferrule 13 as the rollers are urged outwardly against the resilience of the sleeve 28.

When the right-hand end of the connector part 2 as viewed in FIG. 3 is drawn into the left-hand end of the connector part 1 as viewed in FIG. 1 by screwing a securing nut 26 on part 1 on to a threaded collar 27 of the connector part 2, the end of ferrule 14 is urged into the left-hand end of the self-centering guide roller/cage assembly so that the rollers 21 make line pressure engagement along the ferrule 14 thus causing the precision cylindrical surface of the ferrule 14 be aligned co-axially with the corresponding surface of the ferrule 13 already inserted in the guide assembly. The opposed ends of the two ferrules 13 and 14 abut against one another as do the faces of the optical fibres 11 and 12 which are carried by the ferrules and which will be accurately co-axially aligned with each other by means of the self-centering guide roller/cage assembly. When the two connector parts 1 and 2 are fully drawn together the ferrule 14 and flanged part 16 secured to it will be moved against the action of the compression spring 18 so that the faces of the optical fibres 11 and 12 which abut against one another will be held in the pressure engagement by the spring force exerted by the compression spring 18.

What we claim is:

1. An optical-fibre connector for effecting optical end-to-end coupling between two optical fibres, each fibre of which is fitted, at the end to be coupled, with a ferrule having a precision-cylindrical outside surface of a diameter within a given range, the end of each said fibre being received in said ferrule coaxially with said cylindrical surface, said connector comprising: a set of cylindrical rollers of equal diameter, each terminated at both ends by a tapered end portion; a cage structure holding said rollers parallel to each other and uniformly spaced from each other in an annular array about a central axis parallel to the cylinder axis of the rollers while allowing the rollers to move radially of said central axis between an innermost position at which the diameter of the interior common tangent cylinder of all the rollers is smaller than the minimum diameter of said given range, and a further position at which the diameter of said tangent cylinder is greater than the maximum diameter of said range; and an annular spring means encircling said case structure for engaging all the rollers and thereby urging said rollers onto said innermost position while yielding resiliently to movement of the rollers towards said further position, thereby allowing the endwise insertion of two such ferrules along the central axis from opposite ends while causing said rollers to ensure mutual axial alignment of said ferrules.

2. An optical fibre connector as claimed in claim 1, in which the set of rollers comprises three identical rollers located in the respective openings of a three-limbed cage structure.

3. An optical fibre connector as claimed in claim 1 or claim 2, in which the cage structure is surrounded by a resilient sleeve co-axial with and embracing the rollers.

4. An optical fibre connector as claimed in claim 3, in which the sleeve is composed of rubber-type resilient material bonded to the rollers.

5. An optical-fibre connector as claimed in claim 1, wherein said cage structure comprises a number of guide elements equal to the number of said rollers, said guide elements being wholly confined between an inside diameter exceeding the largest diameter of said range, and an outside diameter smaller than the sum of the smallest diameter of said range plus twice the diameter of said rollers; and two end portions having an outside diameter substantially greater than the outside diameter within which the guide elements are confined.

6. An optical fibre connector as claimed in claim 5, wherein said annular spring means is a resilient sleeve accommodated between said end portions of said cage structure and surrounding said guide elements thereof.

7. A connector as claimed in claim 1, which further includes two housing members for respectively supporting the two ferrules to be coupled, said housing members having complementary means, substantially coaxial with the ferrules, for moving the housing members, together with the ferrules therein supported towards each other in approximate axial alignment of said ferrules, said cage structure, rollers, and annular spring means being mounted in one of said housing members with approximately half the length of the cylindrical surface of the rollers in engagement with the end of the ferrule that is mounted in said one housing member, thus permitting the end of the ferrule mounted in the other housing member to be axially introduced between, and thus aligned and centered by, the remaining length of the cylindrical surfaces of the rollers.

8. An end-to-end optical fibre junction which comprises: a pair of optical-fibre ends in mutually abutting aligned relation, two ferrules, each having a precision-cylindrical outside surface, said fibre ends being respectively secured in said ferrules in accurate coaxial alignment of said cylindrical surfaces thereof, and each said ferrule and fibre end terminating in a common flat face normal to the axis of said cylindrical surface of the ferrule, a set of cylindrical rollers of equal diameter, each having a tapered portion at each end, said rollers being arranged parallel to each other in an annular array coaxially surrounding the abutting fibre ends and ferrules, each roller being in line contact with the respective cylindrical surfaces of both said ferrules, a cage structure ensuring uniform angular spacing of said rollers about the axis of said ferrules while permitting some radial movement of said rollers towards and away from said axis, said cage structure having, at least for part of its roller-guiding length, an outer diameter smaller than the outer cylinder surface of common contact with all said rollers, and annular spring means engaging all said rollers at the outer side of said cage structure where said structure has such outer diameter, to urge said rollers into contact with said cylindrical surface of each of said ferrules.

* * * * *